United States Patent
Bergmeister et al.

(10) Patent No.: US 6,855,781 B2
(45) Date of Patent: Feb. 15, 2005

(54) PROCESS TO PRODUCE POLYMERS

(76) Inventors: Joseph J. Bergmeister, 1024 Grandview Rd., Bartlesville, OK (US) 74006; Steven J. Secora, 5932 Martin La., Bartlesville, OK (US) 74006; Elizabeth A. Benham, 431 Shannon, Bartlesville, OK (US) 74006; Max P. McDaniel, 1601 Melmart Dr., Bartlesville, OK (US) 74006

( * ) Notice: Subject to any disclaimer, the term of this patent is extended or adjusted under 35 U.S.C. 154(b) by 0 days.

(21) Appl. No.: 10/355,560

(22) Filed: Jan. 31, 2003

(65) Prior Publication Data

US 2003/0134065 A1 Jul. 17, 2003

Related U.S. Application Data

(63) Continuation of application No. 09/361,539, filed on Jul. 27, 1999, now Pat. No. 6,569,960.

(51) Int. Cl.$^7$ .............................. C08F 4/69; C08F 4/643
(52) U.S. Cl. ........................ 526/106; 526/104; 526/113; 526/130; 526/134; 526/348; 526/348.1; 526/348.5
(58) Field of Search ................................ 526/104, 106, 526/113, 130, 134, 348, 348.1, 348.5

(56) References Cited

U.S. PATENT DOCUMENTS

| | | | |
|---|---|---|---|
| 3,887,494 A | 6/1975 | Dietz | 252/452 |
| 4,587,227 A | 5/1986 | Smith et al. | 502/153 |
| 5,208,309 A | 5/1993 | McDaniel et al. | 526/348.2 |
| 5,486,584 A | 1/1996 | Badley et al. | 526/95 |
| 5,543,376 A | 8/1996 | Bergmeister | 502/117 |
| 5,624,877 A | 4/1997 | Bergmeister et al. | 502/120 |
| 5,648,439 A | 7/1997 | Bergmeister et al. | 526/96 |
| 6,201,077 B1 * | 3/2001 | Bergmeister et al. | 526/104 |
| 6,204,346 B1 * | 3/2001 | Bergmeister et al. | 526/104 |

FOREIGN PATENT DOCUMENTS

| | | |
|---|---|---|
| EP | 0 832 905 A1 | 4/1998 |
| EP | 0 857 736 A1 | 8/1998 |
| EP | 0 863 166 A2 | 9/1998 |
| GB | 2 068 982 A | 8/1981 |

* cited by examiner

Primary Examiner—Roberto Rabago

(57) ABSTRACT

A process to produce ethylene polymers is provided. Particularly, a process to produce ethylene polymers having a broad molecular weight distribution is provided. More particularly, a process to produce ethylene polymers that have low formation of smoke and odor during blow molding is provided.

9 Claims, No Drawings

PROCESS TO PRODUCE POLYMERS

This is a continuation of application Ser. No. 09/361,539, filed Jul. 27, 1999, now U.S. Pat. No. 6,569,960.

FIELD OF THE INVENTION

This invention is related to the field of processes that produce polymers, where said polymers comprise polymerized ethylene. The phrase "ethylene polymers" as used in this application includes homopolymers of ethylene, and copolymers of ethylene with another monomer. Particularly, this invention is related to the field of processes that produce ethylene polymers having a broad molecular weight distribution. More particularly, this invention is related to the field of processes that produce ethylene polymers that have low formation of smoke and odor during blow molding.

BACKGROUND OF THE INVENTION

There are many production processes that produce ethylene polymers. Ethylene polymers are utilized in many products, such as, for example, films, coatings, fibers, bottles and pipe. Producers of such ethylene polymers are continuously conducting research to find improved ethylene polymers.

Ethylene polymers with a broad molecular weight distribution generally have excellent processing characteristics such as, for example, high shear ratio, high shear at onset of melt fracture, low weight and die swell, and excellent physical properties such as high environmental stress crack resistance. However, often times, these ethylene polymers can produce smoke and odors when blow molded into manufactures.

This invention provides ethylene polymers having a broad molecular weight distribution and also low formation of smoke and odors during blow molding. Due to these improved properties, these ethylene polymers are ideal for blow molding bottles and other manufactures.

SUMMARY OF THE INVENTION

It is an object of this invention to provide a process to polymerize ethylene, or to copolymerize ethylene with at least one other monomer, to produce ethylene polymers.

It is another object of this invention to provide said ethylene polymers.

It is another object of this invention to provide ethylene polymers having high environmental stress crack resistance and low formation of smoke and odor during blow molding.

It is yet another object of this invention to provide a process to use said ethylene polymers to produce a manufacture.

It is still yet another object of this invention to provide a manufacture comprising said ethylene polymers.

In accordance with this invention, a process is provided, said process comprising polymerizing ethylene, or copolymerizing ethylene with at least one other monomer, wherein said polymerizing is conducted:

in a loop reactor with isobutane as a diluent;
at a temperature in a range of about 200° F. to about 220° F.;
with a catalyst system comprising chromium and a support;
in the presence of at least one trialkylboron;
wherein the chromium is present in a range of about 1% by weight to about 4% by weight based on the weight of the support;
wherein said support comprises silica and titania;
wherein said support has a surface area of about 400 m²/gram to about 800 m²/gram and a pore volume of about 1.8 ml/gram to about 4 ml/gram;
wherein the titania is present in a range of about 0.5% by weight to about 3% by weight titanium based on the weight of the support;
wherein said catalyst system is activated at a temperature from about 1000° F. to about 1300° F.;
wherein said trialkylboron is represented by the formula, $BR_3$, where R is an alkyl group of up to 12 carbon atoms.

In another embodiment of this invention, said ethylene polymers are provided.

In yet another embodiment of this invention, a process for using said ethylene polymers to produce a manufacture is provided.

In still another embodiment of this invention, a manufacture is provided comprising said ethylene polymers.

These and other objects of this invention will become more evident from the following description and claims.

DETAILED DESCRIPTION OF THE INVENTION

A process comprising polymerizing ethylene, or copolymerizing ethylene with at least one other monomer is provided. Said "at least one other monomer" can be olefins having from 4 to about 16 carbon atoms per molecule. Suitable monomers, that can be polymerized with ethylene to produce copolymers with excellent properties, can be selected from the group consisting of 1-butene, 1-pentene, 4-methyl-1-pentene, 1-hexene, 1-octene.

The polymerizing is conducted in a loop reactor process at a temperature in a range of about 200° F. to about 220° F. with isobutane as a diluent. The loop reactor process is well known in the art and is disclosed, for instance, in Norwood, U.S. Pat. No. 3,248,179, the disclosure of which is hereby incorporated by reference.

The polymerizing is conducted using a catalyst system comprising chromium and a support. The chromium can be any suitable chromium compound that facilitates the polymerization of olefins. Suitable examples of chromium compounds include, but are not limited to, chromium nitrate, chromium acetate, chromium trioxide, and mixtures thereof. The amount of chromium present is from about 1% by weight to about 4% by weight. Preferably, the amount of chromium present is from about 1.5% by weight to about 3.5% by weight, most preferably, from 2% by weight to 3% by weight, where such weight percents are based on the weight of the support.

The chromium can be combined with the support in any manner known in the art. Examples of combining the chromium with the support can be found in U.S. Pat. Nos. 3,976,632; 4,248,735; 4,297,460; and 4,397,766; the entire disclosures of which are hereby incorporated by reference.

The term "support" is not meant to be construed as an inert component of the catalyst system. The support used in the catalyst system of this invention comprises (or alternatively, "consists essentially of" or "consists of") silica and titania. These supports are known in the art and are disclosed in U.S. Pat. Nos. 2,825,721; 3,225,023; 3,226,205; 3,622,521; 3,625,864; 3,780,011; 3,887,494; 3,900,457; 3,947,433; 4,053,436; 4,081,407; 4,151,122; 4,177,162; 4,294,724; 4,296,001; 4,392,990; 4,402,864; 4,405,501; 4,434,243; 4,454,557; 4,735,931; 4,981,831; and 5,037,911, the entire disclosures of which are hereby incorporated by reference. However, it should also be noted that these supports are available commercially from such sources as the W. R. Grace Corporation.

Generally, the amount of titania present is from about 0.5% by weight to about 3% by weight titanium. Preferably, the amount of titania present is from about 0.8% by weight to about 2.6% by weight titanium, most preferably from 0.8% by weight to 1.5% by weight titanium, where such weight percents are based on the weight of the support.

The support has a surface area from about 400 m²/gram to about 800 m²/gram. Preferably, the support has a surface area from about 450 m²/gram to about 700 m²/gram, and most preferably, from 500 m²/gram to 600 m²/gram. Furthermore, the support has a pore volume of from about 1.8 ml/gram to about 4 ml/gram. Preferably, the support has a pore volume of from about 2 to about 3.5 ml/gram, and most preferably, from 2.3 ml/gram to 3 ml/gram.

The catalyst system used in this invention is activated in accordance with any manner known in the art that will contact an oxygen containing ambient with the catalyst system. Suitable examples of this type of procedure can be found in U.S. Pat. Nos. 3,887,494; 3,900,457; 4,053,436; 4,081,407; 4,296,001; 4,392,990; 4,405,501; and 4,981,831, the entire disclosures of which are hereby incorporated by reference. Generally, activation is conducted at a temperature in a range of about 1000° F. to about 1300° F. Preferably, activation is conducted at a temperature in a range of about 1050° F. to about 1250° F., and most preferably, from 1100° F. to about 1200° F. Currently, the preferred oxidizing ambient is air. This activation is carried out for a time period of about 1 minute to about 50 hours. This allows for at least a portion of any chromium in a lower valance state to be converted to a hexavalent state.

The polymerizing is also conducted in the presence of at least one trialkylboron with a formula, $BR_3$, where R is an alkyl group of up to 12 carbon atoms. Preferably, said trialkylboron is triethylboron (TEB). The amount of the cocatalyst used in a polymerization, stated in parts per million by weight based on the weight of the diluent in the reactor, is from about 1 part per million to about 6 parts per million. Preferably, it is from about 1.5 parts per million to about 4 parts per million, and most preferably, it is from 2 parts per million to 3 parts per million.

Hydrogen can be present in the loop reactor to control molecular weight. Currently, about 0 to about 3 mole percent hydrogen can be used.

Generally, said ethylene polymers produced by this process have the following properties: a high load melt index (HLMI) of about 10 to about 60 grams per ten minutes; a density of about 0.950 to about 0.960 grams per cubic centimeter; a shear ratio (high load melt index (HLMI)/melt index (MI)) of about 100 to about 300, a polydispersity (weight average molecular weight (Mw)/number average molecular weight (Mn)) of about 15 to about 30; a Environmental Stress Crack Resistance (ESCR) (Condition A) of greater than 300 hours; xylene solubles of less than 1.0%; and a low molecular weight polymer content of less than 2%. Low molecular weight polymer is ethylene polymer with a molecular weight of less than 1000. Test methods to determine these properties are described subsequently in the Examples.

It is preferred when said ethylene polymers have a HLMI of about 15 to about 40 grams per ten minutes, and most preferably, 15 to 30 grams per ten minutes.

It is also preferred when said ethylene polymers have a density of about 0.952 to about 0.958 grams per cubic centimeter, and most preferably, 0.953 to 0.957 grams per cubic centimeter.

It is also preferred when said ethylene polymers have a shear ratio (HLMI/MI) of about 120 to about 200, most preferably, from 130 to 180.

It is also preferred when said ethylene polymers have a polydispersity (Mw/Mn) of about 18 to about 25, and most preferably, of 19 to 25.

It is also preferred when said ethylene polymers have a Environmental Stress Crack Resistance (Condition A) of greater than about 400 hours, and most preferably, greater than 500 hours.

It is also preferred when said ethylene polymers have a low formation of smoke and odor when blow molded into manufactures as indicated by having less than 0.85% xylene solubles and less than 1.6% low molecular weight polymer. Most preferably, said ethylene polymers have less than 0.6% xylene solubles and less than 1% low molecular weight polymer.

Said ethylene polymers can be used to produce manufactures. Said ethylene polymers can be formed into a manufacture by any means known in the art. For example, said ethylene polymers can be formed into a manufacture by blow molding, injection molding, and extrusion molding. Further information on processing said ethylene polymers into a manufacture can be found in MODERN PLASTICS ENCYCLOPEDIA, 1992, pages 222–298. One important application for said ethylene polymers is the production of bottles and other manufactures by blow molding.

EXAMPLES

These examples are provided to further illustrate the invention. The scope of the invention should not be limited to these examples.

Test Methods

A Quantachrome Autosorb-6 Nitrogen Pore Size Distribution Instrument was used to determined the surface area and pore volume of the supports. This instrument was acquired from the Quantachrome Corporation, Syosset, N.Y.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Melt index (MI, g/10 minutes) was determined in accordance with ASTM D1238 at 190° C. with a 2,160 gram weight.

High load melt index (HLMI, g/10 minutes) was determined in accordance with ASTM D1238 at 190° C. with a 21,600 gram weight.

Environmental Stress Crack Resistance (ESCR, hrs) was determined according to ASTM D1693, Conditions A and B.

The Heterogeneity Index (HI) was determined using size exclusion chromatography (SEC) analyses that were performed at 140° C. on a Water, model 150 GPC with a refractive index detector. A solution concentration of 0.25 weight percent in 1,2,4-trichlorobenzene was found to give reasonable elution times. To determine smoke potential of the ethylene polymer, the amount of ethylene polymer in the <1000 molecular weight range was calculated.

Ethylene polymers obtained by this invention are useful for blow molding applications. In these examples, blow molding evaluations were conducted by blowing a one gallon (105.1 gm) bottle on a Uniloy 2016 single head blow molding machine using a 2.5 inch diameter die, 20 degree diverging die, 32% accumulator position, 8.5 second blow time, 0.10 second blow delay, 0.75 second pre-blow delay and a 45° F. mold temperature. A reciprocating screw speed of 45 revolutions per minute (rpm) was used, providing parison extrusion at shear rates greater than 10,000/sec through the die.

Percent weight swell measures the amount a molten polymer expands immediately as it exits the die. It is a measure of the "memory" of the polymer chains as they seek to relax and thus reform the polymer shape. Weight swell is an important parameter as it determines how tight a die gap must be adjusted to provide a constant bottle weight. If a polymer has high weight swell, the die gap required will be tighter to make a proper part weight. In so doing, it will require higher stress to push the polymer through the die than a lower weight swell polymer. Weight swell is defined as the ratio of the die gap to the final bottle wall thickness.

Another measurement of swell is die swell or diameter swell. This is the ratio of a parison diameter to a die diameter. These numbers are referenced to a standard commercial blow molding polymer, Marlex®5502 polyethylene, obtained from Phillips Petroleum Company.

Bottle stress crack resistance was tested using ten 105 gram one gallon bottles made as described above on a Uniloy 2016 machine. The bottles were filled with a 10% Orvus-K detergent solution, capped, and placed in a 140° F. hot room. Bottle failures were noted each day, and a 50% mean failure time was calculated for each set.

Onset of melt fracture of each ethylene polymer was evaluated on the same Uniloy machine by opening the die gap and extruding the ethylene polymer. Shear rate was increased steadily by increasing the screw rpm. Onset was the rpm at which the parison showed visible signs of melt fracture, such as a shark skin appearance or a distorted surface.

Two methods to measure a polymer's ease of processibility were utilized in these examples. The first, listed as "Output" in the tables presented subsequently in this disclosure, was calculated from the cycle time of the machine and the weight of the bottle and flashing. Thus, this measure describes the rate of bottle output in pounds of polymer per hour at which the polymer in question was blow molded into bottles during normal operation. Therefore, it is a measure of the commercial rate of bottle production. The second measure of polymer processibility is listed as "1-Minute Output" in the tables presented subsequently in this disclosure. It describes the speed at which one part of the blow molding operation was accomplished. For this test, the extruder on the blow molding machine was set at 45 rpm, and it was allowed to extrude polymer for one full minute at the same die gap used to make the desired bottles. After 1 minute, the test was stopped, and the polymer was weight to determine the 1-minute output value. Thus, the 1-minute output value gives an indication of the rate of extrusion of the polymer during the blow molding operation.

Xylene solubles (%) was determined in accordance with ASTM D-5492–94.

Subjective ratings were also made by the operator running the blow molding machine, in which he judged the degree of smoke and odor production by the ethylene polymer during processing, the degree of melt fracture, and the processibility of the ethylene polymer. On this scale, the best ethylene polymers were given a 1 and the worst a 5. Ratings in the 1 to 3 range were considered acceptable.

Invention Examples 1–5 (Table One)

Ethylene polymers were prepared by contacting a catalyst system with monomers in a continuous, particle form process which employed a liquid full 15.2 cm diameter pipe loop reactor having a volume of 23 gallons (87 liters), isobutane as the diluent, and occasionally some hydrogen to regulate the molecular weight of the ethylene polymer produced. The loop reactor was operated to have a residence time of 1.25 hours. The reactor temperature was varied over a range of 95° C. to 107° C., depending on the particular experiment, and the pressure was four Mpa (580 psi). At steady state conditions, the isobutane feed rate was about 46 liters per hour, the ethylene feed rate was about 30 lbs/hr, and the 1-hexene feed rate was varied to control the density of the ethylene polymer. Ethylene polymer was removed from the loop reactor at the rate of 25 lbs per hour and recovered in a flash chamber. A Vulcan dryer was used to dry the ethylene polymer under nitrogen at about 60° C. to 80° C.

Ethylene that had been dried over alumina was used as the monomer. Isobutane that had been degassed by fractionation and dried over alumina was use as the diluent. Triethylboron (TEB) or triethylaluminum (TEA) was also sometimes used as a cocatalyst as indicated in the tables below.

In example 1 and 4–6, a commercially available catalyst system, designated 963 Magnapore, was purchased from the W. R. Grace Corporation. It had a chromium content of about 1.0 weight percent based on the weight of the support and about 2.5 weight percent titanium based on the weight of the support. It had a surface area of about 500 to 550 square meters per gram and a pore volume of about 2.4 to 2.6 ml/g.

In examples 2 and 3, another catalyst system was obtained from W. R. Grace, designated Magnapore-1, which was essentially identical to 963 Magnapore except that it contained 1.0 weight percent titanium based on the weight of the support.

In some cases, as indicated in the tables below, extra chromium was added to the catalyst system. This was accomplished by impregnating the catalyst system to incipient wetness or somewhat less, with a methanol solution of chromium (III) nitrate containing 0.05 grams of chromium per 100 milliliters.

In Inventive Examples 1–6, the ethylene polymer produced had broad molecular weight distributions as shown by having a shear ratio of 145 to 250, a polydispersity of 19.8 to 24.7, and a ESCR (Condition A) of 321 to greater than 1000 hours. In addition, the ethylene polymers have a low percentage of low molecular weight polymer (0.44%–1.97% by weight), and xylene solubles (0.20%–0.96%), thereby having low smoke and odor when blow molded into manufactures.

Comparative Examples 1–15 (Table Two)

Ethylene polymers were prepared in the same loop reactor and under the same process parameters as described above except the amount of titanium and cocatalyst, the surface area, and the pore volume were varied outside the limits of this invention.

Various catalysts and cocatalysts were used in these runs as indicated in the table and descriptions below.

In comparative examples 1–5 and 12, a commercially available catalyst system, designated 964 Magnapore, was purchased from the W. R. Grace Corporation. It had a chromium content of about 0.8 weight percent based on the weight of the support and about 5 weight percent titanium based on the weight of the support. It had a surface area of about 550 to 600 square meters per gram and a pore volume of about 2.1 to 2.3 ml/g.

In comparative example 6, a catalyst system was obtained from the W. R. Grace Corporation, designated HPVSA indicating its relatively high pore volume and surface area compared to standard 969MS grades. It had a surface area of 577 square meters per gram and a pore volume of 2.21 ml/g.

In comparative examples 7–9, a commercially available catalyst system, designated 963 Magnapore, was purchased from the W. R. Grace Corporation. It had a chromium content of about 1.0 weight percent based on the weight of the support and about 2.5 weight percent titanium based on the weight of the support. It had a surface area of about 500–550 square meters per gram and a pore volume of about 2.4–2.6 ml/g.

In comparative example 9, a commercially available catalyst system was purchased from the W. R. Grace Corporation. This catalyst system was sold under the name of 965 Sylopore. It had surface area of about 400 square meters per gram and a pore volume of about 1.0 ml/g.

In comparative example 10, titanium was added to a 969MS catalyst system obtained from W. R. Grace Corporation by first drying the 969MS catalyst in dry nitrogen in a fluidized bed at 400–500° F., then lowering the temperature to 250° F.–400° F. during which time titanium isopropoxide liquid was added over a period of about one hour. The titanium isopropoxide evaporated while transported by the nitrogen in a 1/8" stainless steel coil which introduced the vapor into the bottom of the bed. After all the titanium had been added, the nitrogen gas stream was replaced by dry air, and the temperature was increased to the desired activation temperature in the usual fashion. The final catalyst composition was analyzed after activation.

In comparative example 11, a catalyst system was obtained from W. R. Grace Corporation designated HPV silica. It had a surface area of about 300 square meters per gram, and a pore volume of about 2.5 ml/g.

In comparative example 13, a commercially available catalyst system was purchased from the W. R. Grace Corporation called 969MS. This catalyst had a surface area of about 300 square meters per gram, and a pore volume of about 1.6 ml/g.

As can be seen in Table Two, the objects of this invention, such as, low smoke and odor potential, high ESCR, low swell, and high shear at melt fracture are not achieved when the catalyst system and operating parameters of this invention are not met. Thus, in comparative runs 1–5 and 12, where the titanium content of the catalyst system was too high, the molecular weight distribution became too broad as indicated by the shear ratio (HLMI/MI) and polydispersity (Mw/Mn) giving excessively high smoke and odor formation as indicated by high low molecular weight content and xylene solubles.

In contrasting runs 6, 11, and 13, where the titania was too low, the molecular weight distribution was not broad enough (HLMI/MI and Mw/Mn) which led to poor ESCR, swell or output.

Likewise, surface area, pore volume, activation temperature, and cocatalyst are also varied in the table with the result that desired ethylene polymer properties were not obtained if the catalyst system and operating parameters were varied outside of the prescribed bounds of this invention. In Run 8, cocatalyst was not used, and the ethylene polymer produced had a low ESCR. In Runs 9 and 10, a catalyst system having lower surface area and pore volume than specified in the invention produced ethylene polymer having a lower shear ratio and ESCR (Condition A). Chromium content affects swell, as does surface area and pore volume. Cocatalyst affects ESCR, as does activation temperature. Titanium content affects the production of smoke when the ethylene polymer is blow molded into manufactures.

TABLE ONE

| Invention Example No. | 1 | 2 | 3 | 4 | 5 | 6 |
|---|---|---|---|---|---|---|
| % Titanium (Ti) | 2.5 | 1.0 | 1.0 | 2.5 | 2.5 | 2.5 |
| % Chromium (Cr) | 2.0 | 2.0 | 2.0 | 2.0 | 2.0 | 2.0 |
| Surface Area (SA) (m$^2$/g) | 540 | 560 | 560 | 540 | 540 | 540 |
| Pore Volume (PV) (ml/g) | 2.6 | 2.7 | 2.7 | 2.6 | 2.6 | 2.6 |
| Activation Temp. (° F.) | 1100 | 1100 | 1200 | 1200 | 1100 | 1000 |
| Cocatalyst | TEB/TEA | TEB | TEB | TEB | TEB | TEB |
| Cocatalyst (ppm by weight) | 2.3/2.3 | 1.94 | 2 | 2.05 | 2 | 2 |
| Productivity (g/g) | 1504 | 6250 | 1558 | 7143 | 5882 | 7692 |
| HLMI (g/10 min.) | 21.8 | 15.2 | 19.7 | 12.5 | 17.2 | 19.2 |
| Shear Ratio (HLMI/MI) | 145 | 217 | 164 | 250 | 191 | 175 |
| Density (g/ml) | 0.9547 | 0.9557 | 0.956 | 0.9537 | 0.9559 | 0.9545 |
| Polydispersity (Mw/Mn) | 22.7 | 19.8 | 22.8 | 23.4 | 21.4 | 24.7 |
| ESCR-A (hrs) | 1000 | 441 | 321 | >1000 | >1000 | >1000 |
| ESCR-B (hrs) | 100 | 120 | 76 | 180 | 144 | 241 |
| Bottle ESCR (hrs) | NA | NA | NA | NA | >700 | >700 |
| Die Swell (%) | 46 | 42.9 | 45 | 40.3 | 44.9 | 46.4 |
| Weight Swell (%) | 409 | 338 | 404 | 386 | 414 | 436 |
| Shear Rate at onset of Melt Fracture (sec$^{-1}$) | 1504 | 1183 | 1558 | 2090 | 2234 | 2227 |
| Output (lbs/hr) | 81.6 | 86.1 | 86.1 | 79.8 | 71 | 54.8 |
| % Low Molecular Weight (<1000) | 0.85 | 0.91 | 0.44 | 1.58 | 1.43 | 1.97 |
| Smoke Rating (1–5) | 2 | 2 | 2 | 3 | 3 | 3 |
| Melt Fracture Rating (1–5) | 2 | 2 | 2 | 3 | 2 | 2 |
| Odor Rating (1–5) | 3 | 3 | 3 | 3 | 3 | 3 |
| 1 minute Output (grams) | 915 | 711 | 1125 | 1257 | 1343 | 1339 |
| Xylene Solubles (%) | 0.20 | 0.56 | 0.52 | 0.92 | 0.80 | 0.96 |

TABLE TWO

| Comparative Example #:<br>Deviative Variable | 1<br>High Ti | 2<br>High Ti | 3<br>High Ti | 4<br>High Ti | 5<br>High Ti | 6<br>Low Ti | 7<br>TEA |
|---|---|---|---|---|---|---|---|
| % Titanium (Ti) | 5 | 5 | 5 | 5 | 5 | 0 | 2.5 |
| % Chromium (Cr) | 3 | 2 | 1 | 2 | 3 | 2 | 2 |
| Surface Area (SA) (m²/g) | 555 | 555 | 555 | 550 | 555 | 577 | 540 |
| Pore Volume (PV (ml/g) | 2.11 | 2.11 | 2.11 | 2.26 | 2.11 | 2.21 | 2.6 |
| Activation Temp. (° F.) | 1000 | 1000 | 1000 | 1100 | 1000 | 1000 | 1100 |
| Cocatalyst | TEB | TEB | TEB | TEB | TEB | TEB | TEA |
| Cocatalyst (ppm by weight) | 2 | 2 | 2 | 2 | 4 | 2 | 2 |
| Productivity (g/g) | 5882 | 7813 | 3571 | 5556 | 5882 | 8333 | 4167 |
| HLMI (g/10 min.) | 17.8 | 21 | 17.2 | 14.9 | 17.4 | 19.3 | 17 |
| Shear Ratio (HLMI/MI) | 222 | 191 | 191 | 248 | 291 | 138 | 113 |
| Density (g/ml) | 0.9552 | 0.9554 | 0.9567 | 0.9545 | 0.9564 | 0.9541 | 0.9533 |
| Polydispersity (Mw/Mn) | 33.5 | 38.1 | 38.8 | 41.9 | 43.9 | 14.4 | 24 |
| ESCR-A (hrs) | >1000 | >1000 | >1000 | >1000 | >1000 | 395 | 400 |
| ESCR-B (hrs) | 300 | 317 | 429 | 170 | 261 | 73 | 85 |
| Bottle ESCR (hrs) | >700 | >700 | >700 | >700 | >700 | >700 | >700 |
| Die Swell (%) | 38 | 40.1 | 42.6 | 43.9 | 40.1 | 45.4 | 45.1 |
| Weight Swell (%) | 410 | 392 | 395 | 434 | 457 | 375 | 325 |
| Shear Rate at onset of Melt Fracture (sec$^{-1}$) | 2194 | 2155 | 2200 | 2196 | 2169 | 2241 | 1031 |
| Output (lbs/hr) | 59.3 | 70.2 | 56.1 | 58.8 | 58 | 85.2 | 82 |
| % Low Molecular Weight (<1000) | 2.42 | 2.34 | 2.44 | 3.73 | 2.92 | 0.62 | 1.22 |
| Smoke Rating (1–5) | 4 | 4 | 3 | 3 | 4 | 2 | 2 |
| Melt Fracture Rating (1–5) | 4 | 4 | 2 | 2 | 4 | 2 | 2 |
| Odor Rating (1–5) | 5 | 5 | 4 | 3 | 5 | 2 | 2 |
| 1 minute Output (grams) | NA | NA | NA | 1321 | NA | 1348 | 620 |
| Xylene Solubles (%) | 1.20 | 0.80 | 1.07 | 1.12 | 1.10 | NA | 0.6 |

| Comparative Example #:<br>Deviative Variable | 8<br>8<br>no TEB | 9<br>Low PV | 10<br>Low SA | 11<br>Low Ti and SA | 12<br>Hi Ti and TEA | 13<br>All Variables |
|---|---|---|---|---|---|---|
| % Titanium (Ti) | 2.5 | 2.5 | 3 | 0 | 5 | 0 |
| % Chromium (Cr) | 2 | 1 | 1 | 2 | 2 | 1 |
| Surface Area (SA) (m²/g) | 540 | 400 | 300 | 300 | 555 | 285 |
| Pore Volume (PV) (ml/g) | 2.6 | 1 | 1.6 | 2.5 | 2.11 | 1.5 |
| Activation Temp. (° F.) | 1100 | 1100 | 1250 | 1200 | 1100 | 1450 |
| Cocatalyst (ppm by weight) | None | TEB | TEB | TEB | TEA | None |
| Conc. (ppm) | 0 | 2.1 | 6.2 | 2 | 2 | 0 |
| Productivity (g/g) | 16667 | 2600 | | 9091 | 10000 | 2000 |
| HLMI (g/10 min.) | 20.1 | 22.9 | 37.3 | 15.7 | 16.7 | 26.2 |
| Shear Ratio (HLMI/MI) | 87 | 81 | 128.6 | 157 | 139 | 79 |
| Density (g/ml) | 0.9586 | 0.955 | 0.958 | 0.9544 | 0.9545 | 0.9547 |
| Polydispersity (Mw/Mn) | 12.6 | 16.8 | 22 | 14.2 | 30.2 | 6.3 |
| ESCR-A (hrs) | 209 | 170 | 200 | 248 | 304 | <115 |
| ESCR-B (hrs) | 45 | 92 | 50 | 61 | 102 | <50 |
| Bottle ESCR (hrs) | NA | 245 | 180 | 508 | >700 | 114 |
| Die Swell (%) | 51 | 44 | | 41.3 | 44.1 | 39.3 |
| Weight Swell (%) | 353 | | 35 | 334 | 330 | 375 |
| Shear Rate at onset of Melt Fracture (sec$^{-1}$) | 1014 | 601 | | 2437 | 1624 | 2460 |
| Output (lbs/hr) | 85.9 | | | 84.5 | 83.7 | 81.4 |
| % Low Molecular Weight (<1000) | 0 | | | 0.51 | 2.83 | 0 |
| Smoke Rating (1–5) | 2 | | | 2 | 3 | 2 |
| Melt Fracture Rating (1–5) | 2 | | | 2 | 3 | 2 |
| Processing (1–5) | 3 | | | 2 | 3 | 2 |
| Odor Rating (1–5) | 3 | | | 2 | 3 | 1479 |
| 1 minute Output (grams) | 428 | | | 1465 | 976 | |
| Xylene Solubles (%) | 0.28 | | | NA | 0.75 | |

That which is claimed is:

1. Ethylene polymers produced by a process comprising polymerizing ethylene, or copolymerizing ethylene with at least one other monomer, wherein said polymerizing is conducted:

in a loop reactor with isobutane as a diluent;

at a temperature in a range of about 200° F. to about 220° F.;

with a catalyst system comprising chromium and a support;

in the presence of a trialkylboron;

wherein the chromium is present in a range of about 1% by weight to about 4% by weight based on the weight of the support;

wherein said support comprises silica and titania;

wherein said support has a surface area of about 400 m²/gram to about 800 m²/gram and a pore volume of about 1.8 ml/gram to about 4 ml/gram;

wherein the titania is present in an amount sufficient to give titanium in a range of about 0.5% by weight to about 3% by weight based on the weight of the support;

wherein said catalyst system is activated at a temperature from about 1000° F. to about 1300° F.;

wherein said trialkylboron is represented by the formula $BR_3$, where R is an alkyl group of up to 12 carbon atoms; and wherein the process produces an ethylene polymer having the following properties:

a high load melt index of 15 to 40 grams per ten minutes; a density of 0.952 to 0.958 grams per cubic centimeter, a shear ratio (high load melt index/melt index) of 120 to 200, a (weight average molecular weight/number average molecular weight) of 18 to 25, an Environmental Stress Crack Resistance (ASTM D1693, Condition A) of greater than 300 hours, less than 0.85% xylene solubles and less than 1.6% low molecular weight polymer.

2. Ethylene polymers having the following properties: a high load melt index of about 15 to about 40 grams per ten minutes; a density of about 0.952 to about 0.958 grams per cubic centimeter, a shear ratio (high load melt index/melt index) of about 120 to about 200, a polydispersity (weight average molecular weight/number average molecular weight) of about 18 to about 25, a Environmental Stress Crack Resistance (ASTM D1693, Condition A) of greater than 400 hours, less than 0.85% xylene solubles, and less than 1.6% low molecular weight polymer.

3. Ethylene polymers according to claim 2 wherein said ethylene polymers have the following properties: a high load melt index of 15 to 30 grams per ten minutes; a density of 0.953 to 0.957 grams per cubic centimeter, a shear ratio (high load melt index/melt index) of 130 to 180, a polydispersity (weight average molecular weight/number average molecular weight) of 19 to 25, a Environmental Stress Crack Resistance (ASTM D1693, Condition A) of greater than 500 hours, less than 0.6% xylene solubles and less than 1% low molecular weight polymer.

4. A process of using said ethylene polymer of claim 1 to produce a manufacture, comprising forming a manufacture that comprises said ethylene polymer.

5. A manufacture produced by the process of claim 4.

6. A manufacture according to claim 5 wherein said manufacture is a bottle having a low smoke rating as compared with a bottle fabricated in an identical manner from polymer made in an identical process with an identical catalyst except for having 5% by weight titanium based on the weight of the support.

7. An article of manufacture selected from the group consisting of films, coatings, fibers, bottles, and pipes, where the article of manufacture comprises at least one ethylene polymer of claim 1.

8. The article of claim 7, wherein the article is made by a process selected from the group consisting of blow molding, injection molding, and extrusion molding.

9. The article of claim 7, wherein the article is a blow molded bottle.

* * * * *